United States Patent [19]
Noecker et al.

[11] Patent Number: 6,051,320
[45] Date of Patent: Apr. 18, 2000

[54] THIN-WALLED NATURAL RUBBER LATEX MATERIAL SUBSTANTIALLY FREE OF SULFUR AND NITROSAMINES

[75] Inventors: Audra Noecker, Sturgis, Mich.; Teon Hau Ho, Jenjarom, Malaysia

[73] Assignee: Audra International, L.L.C., Sturgis, Mich.

[21] Appl. No.: 08/687,255

[22] Filed: Jul. 25, 1996

Related U.S. Application Data

[63] Continuation-in-part of application No. 08/521,244, Aug. 30, 1995, abandoned.

[51] Int. Cl.[7] .................................................. B32B 9/04
[52] U.S. Cl. ......................... 428/447; 2/161.7; 525/387
[58] Field of Search .................................. 525/333.8, 387, 525/386; 524/493; 428/492, 447

[56] References Cited

U.S. PATENT DOCUMENTS

| | | | |
|---|---|---|---|
| 2,445,727 | 7/1948 | Kinzinger . | |
| 2,535,659 | 12/1950 | Wolff | 524/493 |
| 2,574,902 | 11/1951 | Bechtold | 525/387 |
| 2,802,891 | 8/1957 | Feild | 525/387 |
| 2,819,255 | 1/1958 | Boardman | 525/387 |
| 2,845,411 | 7/1958 | Willis | 525/387 |
| 2,865,882 | 12/1958 | Strassburg | 524/493 |
| 2,868,859 | 1/1959 | Stott | 525/387 |
| 3,129,204 | 4/1964 | Gilmont | 525/387 |
| 3,411,982 | 11/1968 | Kavalir et al. . | |
| 3,534,011 | 10/1970 | Breslow | 525/387 |
| 3,872,515 | 3/1975 | Miner et al. . | |
| 3,914,478 | 10/1975 | Johannson et al. . | |
| 3,967,014 | 6/1976 | Esemplare et al. . | |
| 4,061,709 | 12/1977 | Miller . | |
| 4,082,862 | 4/1978 | Esemplare et al. . | |
| 4,092,279 | 5/1978 | Piskoti . | |
| 4,100,122 | 7/1978 | Kent . | |
| 4,218,548 | 8/1980 | Mageli | 525/387 |
| 4,304,008 | 12/1981 | Joung . | |
| 4,526,579 | 7/1985 | Ainpour . | |
| 4,538,920 | 9/1985 | Drake . | |
| 4,657,959 | 4/1987 | Bryan et al. . | |
| 4,955,392 | 9/1990 | Sorkin . | |
| 5,133,090 | 7/1992 | Modak et al. . | |
| 5,213,723 | 5/1993 | Aoshima et al. . | |
| 5,254,635 | 10/1993 | Stevenson . | |
| 5,284,607 | 2/1994 | Chen . | |
| 5,292,815 | 3/1994 | Wreesman et al. . | |
| 5,296,549 | 3/1994 | Suyama et al. . | |
| 5,335,373 | 8/1994 | Dangman et al. . | |
| 5,458,588 | 10/1995 | Amdur et al. . | |
| 5,472,493 | 12/1995 | Regan . | |
| 5,570,475 | 11/1996 | Nile . | |
| 5,612,436 | 3/1997 | Halasq | 525/331.9 |
| 5,736,251 | 4/1998 | Pinchuk . | |

OTHER PUBLICATIONS

Cabot Coporation, Aqueous Dispersions of Cab–O–Sil, May 1961.
Cab–O–Sil Fumed Properties and Functions, Cabot Corp. Jun. 1987.

(List continued on next page.)

*Primary Examiner*—Christopher Henderson
*Attorney, Agent, or Firm*—Carrier, Blackman & Associates, P.C.; William D. Blackman; Joseph P. Carrier

[57] ABSTRACT

A thin walled natural rubber latex material is disclosed suitable for forming thin walled products including gloves, dental dams and shields, catheter tubing, penrose surgical drains, finger cots, coverings for body parts, and the like. The thin walled material is formed from a latex emulsion containing natural rubber, sulphur-free, oxygen-donating curing agents, and a strength enhancing agent which may be an inorganic substance such as fumed silica and/or an organic substance such as monomers and polymers of families of acrylics and esters. The emulsion also preferably includes microcrystaline wax as an oxygen barrier, and the material is also provided with a heat resistant and water resistant coating which blocks transfer of latex proteins from the material and enhances slip of the material.

2 Claims, 2 Drawing Sheets

OTHER PUBLICATIONS

Technical Bulletin Pigments, Aqueous Aerosil and Aluminium Oxide Dispersions No. 33 Dec. 1982.

Cab–O–Sil How To It Where To Use It, Cabot Corp.

Godrey L. Cabot, Inc., Cab–O–Sil, In The Rubber Industry, Jan. 1955.

Kenneth A. Loftman, Cab–O–Sil In Dipped Latex Films, Technical Service Laboratory Report, Aug. 1959.

Chemical & Engineering News, Soviet Chemical Industry, Jan. 18, 1988.

Cab–O–Sperse, Aqueous Fumed Silica Dispersions, Cabot Corporation 1986.

Rubber Chemicals, vol. 20, pp. 337–364 Rubber Compounding, pp. 418–425; and Rubber Compounding, pp. 468–491, all taken from Encyclopedia of Chemical Technology, 4th Ed. 1994.

Carver Texhnologies, Ltd., Powder–Free Latex Gloves—1995 Publication.

THIN-WALLED NATURAL RUBBER LATEX MATERIAL SUBSTANTIALLY FREE OF SULFUR AND NITROSAMINES

This application is a continuation-in-part (CIP) of application Ser. No. 08/521,244 filed Aug. 30, 1995 now abandoned.

BACKGROUND OF THE INVENTION

1. Technical Field of the Invention

The present invention pertains to sulphur free prevulcanized rubber latex compositions, and to a method of producing same and articles produced therefrom. More particularly, the present invention pertains to oxygen-cured natural rubber latex materials, methods of manufacturing the materials and for forming same into thin walled articles such as gloves, dental dams, catheters, and penrose surgical drains so that the resulting articles are sufficiently strong and flexible, and yet are not chemically reactive with other substances which may be contacted by the articles during subsequent use, and so that the articles are otherwise completely safe for applications involving contact with humans.

2. Description of Relevant Art

Rubber is a very common compound. It is available in many different compositions and forms such as rubber latex. In conventional processes for forming rubber, or for forming products from rubber, rubber is cured or vulcanized so as to join the molecules within the rubber composition together giving the rubber composition desired strength and toughness. Most typically sulphur and sulphur donating compounds are used as the primary curing or vulcanizing agents.

For example, there are many publications available, including publications by Uniroyal, Vanderbilt and Monsanto and K. Othmer, Encyclopedia Of Chemical Technology, 3rd Ed., V.20, pp. 337–364 describing starting formulas for sulphur-cure natural rubber systems. Typically, these formulas will include sulphur or a partial substitute of sulphur such as TMTD, DIAK and Sulfasan (partial substitutes of sulfur being preferred especially when controlled release of available sulphur is required), a zinc-based cross linking agent such as zinc dithiocarbamate (ZDBC) and zinc diethylcarbamate (ZDEC), cure rate accelerators (primary and secondary) such as excessive sulphur, ZDBC and sodium diethylcarbamate (SDBC), and antioxidants which are mostly phenolic or amine compounds.

The curing and vulcanization of rubber compounds may be done at various stages relative to the formation or shaping of products from the rubber compounds. For example, in the manufacture of latex gloves from latex emulsions, it is conventional to vulcanize the composition after it has been shaped into gloves (post-vulcanization process), or the latex emulsion may be vulcanized before it is shaped into the gloves (pre-vulcanization). Typically, the chemicals used for vulcanizing the rubber compositions are consumed more efficiently in pre-vulcanization processes because vulcanization occurs with respect to a large mass of material over a longer length of time. On the other hand, pre-vulcanized gloves are known to be tacky and soft in comparison to the post-vulcanized gloves, which leads to handling problems.

Although products formed from such sulphur-cured natural rubber exhibits some very good qualities, including strength, toughness, elasticity, etc. and are used very effectively in many applications, there are some areas or applications where compatibility problems arise due to the chemicals incorporated into the rubber which react undesirably with foreign materials contacted by products formed from the rubber during the products' subsequent use. Particularly, the sulphur, sulphur compounds, dithiocarbamate compounds, zinc and its compounds which are present on and/or in the surfaces of products formed from the rubber may react with foreign materials contacted during use of the products, resulting in contamination, fouling, spoilage or discoloration of the rubber products or of the materials contacted therewith (either directly or indirectly).

A specific example of a problem which has arisen due to a chemical reaction between chemicals in a conventional rubber product and a foreign material contacted by the rubber product during use is in the field of latex examination gloves. Such gloves are almost always used by persons in the medical and dental field during any procedure requiring bodily contact with a patient, such use is even required by federal and/or state laws in many instances and such gloves are also being used in many other fields. Throughout the application the term "latex gloves" refers to any type of latex glove including examination gloves, surgical gloves, and all purpose gloves.

A common procedure involved in dental examinations is the taking of an impression of a patient's upper or lower dental arch, or of one or several teeth. Such impressions are formed using either a gel-like or putty-like dental impression material (DIM) in a metal or plastic container which is pressed against the dental structure to obtain a negative impression of the patient's teeth or arch. Upon removal of the impression material and container from the patient's oral cavity, it is allowed to cure and harden. Once hardened, a second material such as a flowable plaster is poured into the hardened, negative impression material to obtain a positive impression of the teeth or arch. One such DIM is vinyl polysiloxane distributed by 3M under the trademark EXPRESS™.

The dental community has recently observed a re-occurring problem in forming negative impressions from the DIM caused by chemical reaction(s) with chemicals contained on/in conventional rubber latex gloves. Specifically, after a negative impression has been obtained of the patient's dental structure, portions of the exposed regions of the DIM which had been in contact (direct or indirect) with the gloves often fail to sufficiently cure and harden. Instead, those regions remain uncured and retain their gel or putty-like consistency. This is most undesirable when attempting to subsequently form the positive impression since the uncured regions of the negative impression do not sufficiently retain and transfer the structure and surface details of the patient's teeth or arch which had been previously contacted, to the positive impression material. Regions of the DIM remain uncured because chemicals on/in the latex gloves react with and tie up the platinum base catalyst of the DIM, which catalyst normally assures rapid curing and hardening of the DIM.

Previously, applicant has proposed to overcome such glove contamination problem through post treatment of the manufactured gloves to tie up and/or barricade the offending chemicals on/in the gloves. Particularly, applicant has proposed to tie up the offending chemicals by treating the exterior surfaces of the latex glove with an acidic suspension of metal particles, such as relatively dilute solution of phosphoric acid (0.25–2.0 molar) with finally divided copper and/oriron particles therein. The suspension is applied to the glove exterior in any appropriate manner such as spraying, brushing, wiping, dipping, etc. after which the treated gloves are allowed to dry. Alternatively, or additionally, a water resistant (preferably insoluble) barricade coating was applied to the exterior of the gloves, which was non-toxic and compatible with the latex. Materials suitable for the proposed barrier coating include silicone spray, polyethylene, polypropylene, copolymers of ethylene, polyvinyl chloride, polyesters, copolymers of vinyl chloride, copolymers of vinyl acetate and ethylene, various polyurethanes, polyamides, polyester polyamides, polysiloxanes and various commercially available polymers utilized for hair spray such as octyl acrylamide, acrylate copolymer VA, crotonates, vinyl neodecanoate copolymer, ethyl ester of polyvinyl methacrylate-methyl acrylate copolymer, and methacrylate copolymer.

Although such post treatments of the conventional latex gloves were usually effective for overcoming undesirable chemical reactions between chemicals of the latex gloves and foreign materials such as the DIM contacted by the latex gloves during use, the treated gloves still undesirably reacted with the DIM approximately 10% of the time and this was an unacceptable failure rate. Further, such post treatments have other problems and disadvantages associated therewith, including the additional cost involved with the post treatments, shelf life and reliability of the post treated gloves, undesired reactions of the post treatment materials with other foreign materials subsequently contacted by the gloves, etc.

Another proposed solution to the DIM contamination problem involves chlorine leaching of conventional sulphur cured, natural rubber latex gloves to remove the offending chemicals from at least the surfaces of the gloves. While such leaching may be effective to reduce many instances of the contamination problem, some degree of contamination still occurs at an unacceptable rate such as 10–15% of the time. Additionally, the chlorine leaching also has disadvantages associated therewith, including the fact that the gloves become less soft and flexible, discolored and have a shorter shelf life.

Another problem encountered with conventional sulphur cured, natural rubber latex products are the nitrosamines contained therein. The nitrosamines, which are often generated from the antioxidants used in natural rubber compositions or by other amine compounds used in the rubber latex, are believed to be carcinogenic. Hence it is undesirable to use the conventional compounds having a high nitrosamine content, where products formed from the rubber composition are likely to be contacted by humans, such as with their skin, body fluids, or in their mouths or other body cavities. For this reason, some natural rubber products namely baby pacifier nipples have been formed from substantially nitrosamine-free rubber compositions in which oxygen-donating curing agents such as peroxides are used instead of conventional sulphur and carbamate curing agents.

Such known nitrosamine-free compositions are useful for products such as pacifier nipples because the products have a relatively large wall thickness to give the products sufficient strength and elasticity, and because the increased tackiness of products resulting from the oxygen-donating curing agents is acceptable and even desirable for the products. On the other hand, such nitrosamine-free compositions have not been used for thin-walled rubber latex products such as gloves, dental dams, catheters, penrose drains, etc. because the resulting thin walled products have insufficient strength characteristics including tear strength and tensile strength, and because the increased tackiness of the products causes significant problems for handling, storing and donning the products. The reduced strength characteristics and increased tackiness of the oxygen cured rubber latex compositions results from a decreased cross linking density of the compositions in comparison to that of conventional sulfur cured compositions.

Still another problem associated with rubber latex gloves pertains to the latex proteins inherently found therein. Latex proteins, which exist naturally in natural rubber latex, are essential as an emulsifier to the polyisoprene for maintaining the latex state. Unfortunately, the proteins have caused allergic reactions and other serious health problems in humans, and the latex proteins appear to have a relatively progressive effect on humans such that the undesirable reactions increase in severity with increased exposure to the proteins. For example, conventional latex gloves include a powder or donning agent such as corn starch on the surfaces thereof which facilitates removal of the gloves from a mold and facilitates placing gloves on (donning) and removing the gloves from users' hands. Although the powder acts as a layer between the latex glove and the hand wearing the glove, the latex proteins readily pass through the powder to the skin. In light of the health problems associated with exposure to the latex proteins, two alternative treatments for the gloves have been conventionally utilized to significantly reduce or eliminate the possibility that persons wearing the latex gloves will contact the latex proteins therein. Gloves treated according to such additional treatments are known as "powder-free". The first of such additional treatments is chlorination or chlorine leaching of the gloves, which removes some of the proteins from the gloves. Such chlorination treatment actually weakens the gloves because it initiates a deterioration process, but conventional sulfur-cured gloves remain sufficiently strong even after chlorination. The second of such additional processes involves application of a wax coating whereby the surfaces of the conventional powdered gloves are coated with an ingestible, biodegradable wax material. The wax material may be carnauba wax, which is the same as that used on the candy shells of certain candy products such as M&Ms®. Although such wax coating does not degrade the desired characteristics of the latex glove, it does tend to melt to some extent after being maintained at body temperature over a period of time, and this is undesirable because the melted wax leaves a residue on users' hands after the gloves are removed, which residue is often subsequently transferred to instruments or other articles handled by the users.

The present invention has been developed to overcome the problems and disadvantages of known rubber latex compositions as discussed above, and to fulfill a great need in the art by providing natural rubber latex compositions and products formed therefrom which are essentially free of active chemical compounds (such as sulphur, dithiocarbamates, zinc compounds, etc.) found in conventional sulphur-cured rubber latex products, which are free of other undesirable chemicals such as nitrosamine, and yet have adequate strength, elasticity and other desired characteristics that they can be used in most applications; as well as an efficient, economical process for manufacturing useful thin walled products such as latex gloves, dental dams, catheters and penrose surgical drains from the natural rubber latex compositions.

SUMMARY OF THE INVENTION

According to the invention there is provided a natural rubber latex material, comprising oxygen-cured natural rubber and a strength enhancing agent, wherein the material contains the strength enhancing agent in an amount within the range from about 1–3 parts by weight per 100 parts by weight of natural rubber. Preferably the strength enhancing agent will comprise an inorganic strength enhancing agent such as fumed silica and/or an organic strength enhancing agent such as monomers and polymers of families of acrylics and esters including methamethylacrylic (MMA); and the rubber latex will be cured using the oxygen-donating curing agent, which will include a peroxide such as a butyl peroxide or an alkyl peroxide, or a peroxyester, or a combination thereof, and preferably the rubber latex is natural rubber latex. The rubber latex material will also preferably include a non-amine antioxidizing agent or an antioxidant substitute such as microcrystalline wax so that the latex contains substantially no nitrosamines.

According to other preferred aspects of the invention: the rubber latex material may additionally include a sulphur-free cross linking agent such as tert-butyl hydroperoxide or tetraethylenepentarnine for cross linking the organic strength enhancing agent with polyisoprene in the natural rubber latex; the fumed silica strength enhancing agent is simply added to the latex composition as an aqueous dispersion and does not result in the formation of nitrosamines or the like; the rubber latex material will additionally include a coating over the rubber latex layer for facilitating handling and donning of the products, and for blocking transfer of latex proteins from the rubber latex layer to persons wearing the products; and the blocking coating will be heat resistant and water resistant such that it remains in a solid, non-flowable state after prolonged exposure to human body temperatures and moisture.

Also according to the invention there is provided a process for manufacturing the rubber latex material into thin walled products such as gloves, dental dams, catheter tubing, penrose drains, etc., comprising the steps of: preparing an emulsion of rubber latex together with an oxygen-donating curing agent, and a strength enhancing agent, wherein the emulsion contains the strength enhancing agent in an amount within the range 1–3 parts by weight per 100 parts by weight of natural rubber, pre-vulcanizing the emulsion until it is stable such that substantially none of the curing agent remains free therein; forming the stable emulsion into a thin walled material; leaching the formed material to remove undesired latex proteins and chemicals therefrom; and drying the leached, thin walled material. Again, it is preferred that: the oxygen-donating curing agent is preferably a butyl-peroxide, alkyl-peroxide, peroxyester, and combinations thereof; the rubber latex is natural rubber latex; the strength enhancing agent is an organic strength enhancing agent comprising polymers and/or monomers of families of acrylics and esters, which are polymerized with the polyisoprene molecules of the rubber latex using a cross-linking agent such as tert-butyl hydroperoxide and tetraethylene pentamine; the strength enhancing agent is an inorganic agent such as fumed silica in an aqueous dispersion; the process also includes a step of adding nitrogen free anti-oxidant(s), or an anti-oxidant substitute such as microcrystalline wax, to the latex emulsion such that the manufactured thin walled rubber latex material is substantially free of nitrosoamine; and the process includes a further step of applying a coating to products formed of the thin walled rubber latex material, which coating improves the slip of the matarial and is substantially impermeable to the latex protein and heat resistant such that it remains in a non-flowable state after prolonged exposure to the human body temperatures.

The natural rubber latex compositions are particularly useful when formed into thin walled products including gloves, dental dams, finger cots, catheters, and penrose surgical drains.

It is an object of the invention to provide a thin walled rubber latex material (shaped as gloves, dental dams, catheters, penrose surgical drains or other objects to be worn by humans) which does not contain chemicals or chemical compounds that will react with foreign materials contacted by the thin walled rubber latex material during subsequent use thereof, and to an efficient and economically practical process for manufacturing such rubber latex material.

It is another object of the invention to provide such a thin walled rubber latex material which may be safely and conveniently worn over an extended periods of time by humans without transfer of the latex proteins in the material to human body parts in contact therewith.

It is a further object of the invention to provide such a natural rubber latex material having adequate strength, elongation, texture and other characteristics that it may be reliably used for substantially any application in the medical and dental fields, including thin walled products.

Other objects, advantages and salient features of the invention will become apparent from the following detailed description which, when taken in conjunction with the annexed drawing, discloses preferred embodiments of the invention.

BRIEF DESCRIPTION OF THE DRAWINGS

The drawing FIGURE is a flow chart showing the steps of manufacturing a thin walled rubber latex material according to a preferred embodiment of the invention.

DETAILED DESCRIPTION

Figure 1A:
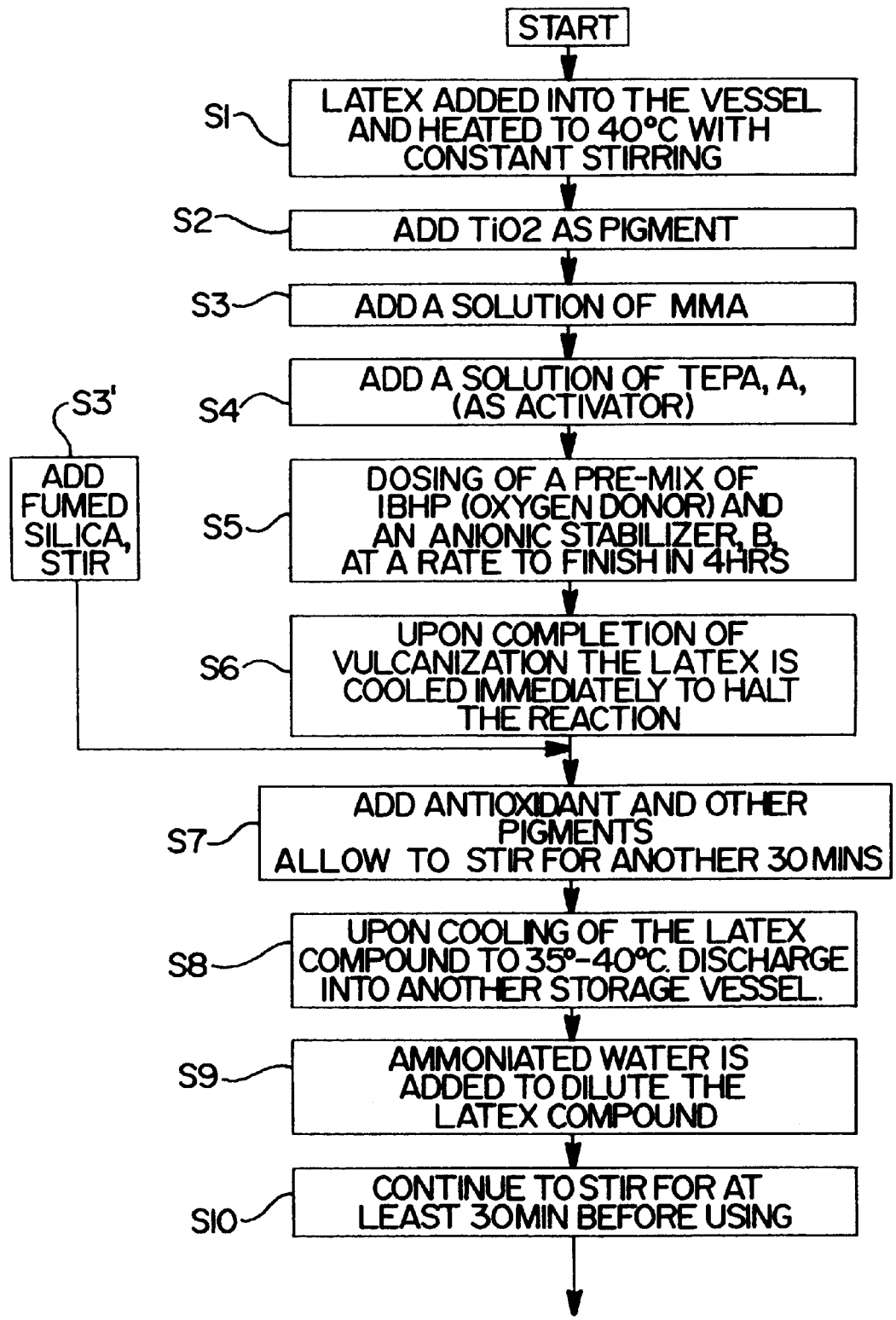
Figure 1B:
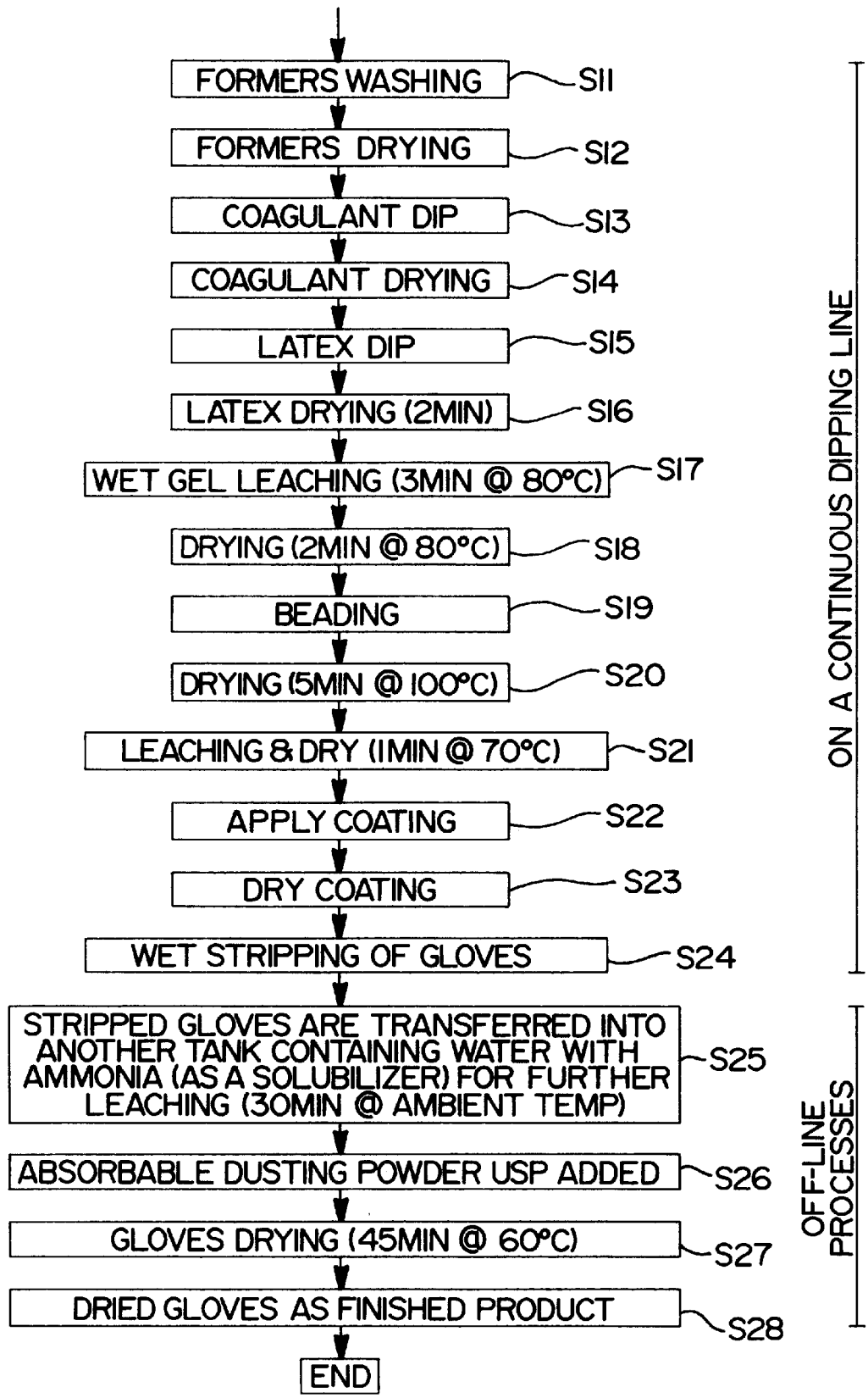

Referring to the drawing there is shown a block diagram of a process for manufacturing thin walled rubber latex material according to the preferred embodiment of the invention. In the first step, S1, a rubber latex emulsion is prepared in a heated reaction vessel with constant mechanical stirring. The latex emulsion includes the conventional natural rubber latex base having polyisoprene. Ultimately, the contents of the reaction vessel will be heated to a temperature of about 40–80° C., and the temperature is closely monitored throughout the reaction process to make sure it does not rise to an excessive temperature. At step S2, a pigment such as titanium dioxide $TiO_2$ is added to the emulsion. At S2, an organic strength enhancing agent such as a monomer and/or polymer is added to the emulsion which will polymerize with the polyisoprene molecules of the rubber latex to give the resulting materials enhanced strength and other desired characteristics. Appropriate monomers and polymers include families of acrylics such as methamethylacrylic (MMA) and families of esters.

At step S4 appropriate activator(s) are preferably added to the emulsion which, like the oxygen-donating curing agents, do not render the final rubber latex material chemically reactive. Some appropriate activators include sugars such as glucose, fructose, lactose, catechol or other substances with the same functional (hydroxy) group; tetraethylenepentamine (TEPA); aldehydes; and other reducing agents. TEPA is a particularly preferred activator because it not only activates the emulsion, but additionally functions as a cross-linking agent for cross-linking the organic strength enhancing agent (e.g., monomers or polymers such as MMA) to the polyisoprene molecules of the natural rubber latex. If an activator besides TEPA is used which is not effective to crosslink the organic strength enchancing agent to the polyisoprene, then a crosslinking agent will also be added at this step.

In step S5 a mixture of an oxygen-donating curing agent together with an emulsifier and/or stabilizer are slowly added to the latex emulsion over an extended period of time such as 3–7 hours, and while the temperature of the vessel is maintained at an elevated temperature such as 60–80° C. During this time period the latex emulsion is pre-vulcanized by the oxygen-donating curing agent and concurrently the organic strength enhancing agent added to the emulsion is cross-linked with the polyisoprene of the rubber latex. In this batch type prevulcanization of the latex emulsion, the oxygen-donating curing agent is substantially fully consumed (the donated oxygen is either incorporated in the vulcanized rubber latex or discharged from the emulsion as a vapor) so that no further curing reaction occurs. According to an important aspect of the invention, appropriate oxygen-donating curing agents which may be used to vulcanize the rubber latex include: butyl-peroxides such as tert-butyl peroxide, di-t-butyl peroxide, bis-2-ethylhexyl peroxydicarbonate, etc.; alkyl-peroxides; and peroxyesters. Appropriate emulsifiers and stabilizers include laureate salts, casein salts, non-ionic and ionic soaps.

As an alternative or supplement to the addition of the organic strength-enhancing agent and the cross linking activator therefor in steps S3 and S4, an inorganic strength enhancing agent may be added as indicated at step S3'. A preferred inorganic strength-enhancing agent is fumed silica, which may be added to the latex emulsion after the pre-vulcanization step S5. The fumed silica is preferably added in the form of an aqueous dispersion containing 10–30% (most preferably 15–20%) solid content. Appropriate fumed silica for making the aqueous dispersions is available from CABOT Corporation of Massachusetts under the trademark Cab-O-Tex™, while such fumed silica is described in U.S. Pat. No. 5,472,493 and other hydrophilic fumed silica is disclosed in U.S. Pat. No. 5,458,588, the disclosures of which are hereby incorporated by reference. After the fumed silica is added, the emulsion should be gently stirred over an extended period such as 1–7 days.

The inorganic strength enhancing agent desirably improves tear & tensile strength without increasing the material's stiffness. Particularly, applicant has found that the thin walled materials formed with a rubber latex composition including the fumed silica have a tear strength which is 10–20% higher than similar materials formed using a composition with an organic strength enhancing agent such as MMA; and that the materials formed exclusively with the inorganic (fumed silica) strength enhancing agent are significantly softer and more pliable than materials formed exclusively with the organic strength enhancing agent, which is very desirable for many products such as gloves, dental dams, catheters and penrose drains. Of course, there are some products in which the compositions with organic strength enhancing agents will be preferred for reasons such as a desired hardness of the products.

Moreover, if the inorganic agent is used instead of the organic agent, the manufacturing process is simplified, i.e., stirring of the inorganic agent into the composition is easily performed, whereas temperature control is necessary with the organic agents such as MMA because the polymerization with TEPA or other cross linking agents generates heat. Further still, elimination of the organic agent and activators therefor (such as TEPA) eliminates potentially undesirable amines in the finished products.

Use of strength enhancing agents (whether organic and/or inorganic) in the natural rubber latex compositions according to the present invention is very important for many applications of the compositions, including thin walled products formed of the compositions such as gloves, dental dams, catheters and penrose surgical drains. Particularly, the oxygen-cured compositions according to the invention result in materials with reduced strength characteristics (tear strength, tensile strength, etc.) as compared to compositions formed with conventional sulphur based curing agents, and such reduced strength materials would have low or insufficient strength characteristics for many products, including thin walled products such as gloves, dental dams, catheters, and penrose drains, if these products were formed with the same wall thicknesses as conventional products formed with the conventional sulphur cured compositions. Again, the reason for this is that the oxygen-donating curing agents do not crosslink the natural rubber latex as effectively as sulphur, resulting in a composition with a smaller cross linking density. To offset the reduced strength characteristics, the strength enhancing agents are added according to the invention to make the compositions suitable even for thin walled products.

Upon completion of the pre-vulcanization in step S5, the cured latex is cooled immediately to halt any further reactions at step S6, while at S7 appropriate antioxidant(s) are added to the emulsion and mixed uniformly therethrough by continued stirring of the emulsion for an additional length of time such as 15–60 minutes. According to an important aspect of the invention, the antioxidants used are preferably of a type which will not generate nitrosamines in the resulting latex material. Such antioxidants most preferably include phosphite type antioxidants and combinations of phosphite type antioxidants (as the primary component) together with phenolic type antioxidants (as the secondary component). Applicant has determined that a combination of phosphite and phenolic type antioxidants yields a synergistic antioxidizing effect in the resulting latex material. Some specific preferred antioxidants according to the invention are styrenated phenol, 2,2'-methylene bis-(6-nonyl-p-cresol), available under the trademark NAUGAWHITE by Uniroyal, tris (mono-dinonyl-phenyl) phosphite.

As an alternative to the antioxidant(s), microcrystalline waxes may be substituted and added to the composition at step S7. Applicant has found that the antioxidants may undesirably react with the oxygen-donating curing agents, even though the antioxidants are added after the cooling step S6, so that it is preferred to use the microcrystalline wax(es) instead of antioxidant(s) in many instances because these waxes are effective oxygen blockers. Some appropriate microcrystalline waxes include Mobilser™ and Mobil™ by Mobil Oil Corp., and it is preferred that rubber compositions will contain the microcrystalline waxes in an amount within the range of 1–5 parts by weight per 100 parts by weight of natural rubber.

At Step S8, the latex emulsion, which has been cooled to an appropriate temperature such as 30–40° C., is discharged from the reaction vessel into a storage vessel where it will remain until it is further processed into thin walled components such as gloves, dental dams and shields, finger cots, foot coverings, catheters, penrose surgical drains, etc. The cured latex emulsion may be safely stored in the storage vessel for long periods of time (weeks and months) without substantially any deterioration. At step S9, ammoniated water may be added to dilute the stored latex compound, and in step S10 the stored compound is stirred for at least 30 minutes before it is to be used in forming products.

In the above steps, S3–S6 curing or pre-vulcanization of the rubber latex with the oxygen-donating curing agent is performed concurrently with polymerization or crosslinking of the organic strength enhancing agent(s) to the rubber polyisoprene molecules, where the organic agent(s) are used. It is, however, possible to separate these procedures so that the polymerization is effected in a separate step after the rubber latex is vulcanized. Similarly, although the antioxidant(s) or substitutes therefor are added to the composition in step S7 after the vulcanization and polymerization is completed, the antioxidant(s) may be added to the latex emulsion prior to the vulcanization and polymerization, or the antioxidants could be subsequently added in a subsequent, separate process just prior to formation of the compound into products, for example.

The steps S11–S28 generally represent formation of the prevulcanized natural rubber latex compounds into end products such as gloves, dental dams or shields, catheters, penrose drains, finger cots, foot coverings, etc., although the steps as fully described below most particularly pertain to the formation of gloves. The steps S1–S24 are preferably performed continuously on a continuous dipping or casting line, while steps S25–S28 are preferably performed off-line.

In step S11, the manufacturing molds or formers are washed in nitric acid, for example, in step S12 the formers are dried, in step S13 they are dipped into a coagulant, in step S14 the coagulant is dried, at step S15 the formers are then dipped into the prevulcanized latex compound generated in steps S1–S10, and in step S16 the dipped latex is predried for an appropriate amount of time such as 0.5–4 minutes at an appropriate temperature such as 100–130° C.

At Step S17, the gloves, which are in a wet gel state, are then leached in water for approximately 1–5 minutes at an appropriate temperature such as 70–100° C., and most preferably at about 80° C., after which the leached gloves are then dried in step S18 for approximately 1–5 minutes at approximately 70–110° C., and most preferably at 80° C. At step S19, the gloves are beaded, at step S20 are further dried at a somewhat higher temperature such as 90–110° C. for an appropriate period of time such as 3–6 minutes, and in step S21 the gloves may optionally be again in leached in water for a brief time such as 0.5–3 minutes at 70–90° C., and dried for a similar length of time at a similar temperature.

Leaching of the products formed from the rubber latex compound is necessary for removing several undesired compounds therefrom, including proteins found intrinsically in the latex, substances generated in the latex compound as a result of reactions with the various chemicals added to the latex emulsion, chemical compounds that are not consumed during the prevulcanization and polymerization processes and which may break down or change their form and undesirably affect the physical properties and aging resistance of the formed products, non-rubber substances in the latex compound, etc. Leaching typically involves soaking the latex products in a medium mainly composed of water at a temperature and duration to achieve the optimal performance of the final products. Additionally, mechanical agitation could be applied during the leaching process. As the performance of the physical properties of the products formed using the sulphur-free latex compound according to the invention depends very much on the leaching efficiency of the product, it is preferred that the wet initial leaching of the product in a wet gel state (S17) and subsequent leaching from the product after it has once been dried (S21) and in a post-stripping step (S25) be performed. The leaching step S21 preferably involves constant exchange of the leaching water for efficiently removing the proteins and other undesired compounds.

According to another important aspect of the invention, after the gloves or other products are leached and dried in steps S17–S21, a heat resistant, water resistant (and preferably insoluble) coating is applied to the gloves in step S22, the coating being substantially impermeable to latex proteins in/on the gloves and being beat resistant such that it remains in a non-flowable state even after prolonged exposure to human body temperatures, such as when the gloves are worn during a lengthy examination procedure. There are two preferred blocking coatings according to the invention. One of the preferred coatings comprises a first layer of a first wax and a second layer of a second wax disposed over the first layer, the second wax having a higher melting point than the first wax. The first wax has a lower softening point than the second wax and functions as a binder for the second wax; whereas the second wax is harder than the first wax and gives a desirable slip to the coated gloves. The coating step S22 preferably involves heating the two layers of wax as deposited on the gloves or other products at a temperature sufficient to melt the first layer and securely bind the layers together and to the latex material. Preferably the second wax is an ingestible, non-toxic wax such as carnauba wax conventionally used to coat latex gloves and to coat the candy shells for various candies such as M&Ms®, and the second wax is preferably another non-toxic wax such as several grades of synthetic waxes like Fitsch-Troppe's waxes having an appropriate softening temperature range. Although the second wax is conventionally used as a coating to for latex gloves, it tends to melt and cause fouling problems when the gloves are worn for a long period of time, as discussed above, while the second wax prevents the fouling problem because it does not melt at human body temperature even after prolonged exposure thereto. The wax coatings may be applied in conventional manners, such as spraying.

The second preferred coating according to the invention is a polymeric coating containing silicone (as a supplemental slip agent), fine particles of silicon dioxide and/or waxes (as primary slip agents), plasticisers or tackifiers such as alkylphenolic resins (to improve adhesion to the rubber material) and a binder such as a water based emulsion of polyvinyl acetate. The silicone based coating is preferably applied by dipping the dried gloves or other products into a coating solution, although the coating solution could be otherwise applied such as by spraying. The coating solution is preferably heat cured at an appropriate temperature and is then dried or dehydrated in step S23 to achieve optimum performance. Subsequent rehydration after curing and drying is minimal. The coating is water insoluble and quite impermeable to latex proteins. The cured, dried coating preferably has a thickness in a range of 0.5–4μ.

The second or silicone based coating is particularly well suited for the latex gloves and other thin walled products formed according to the invention using oxygen-donating curing agents. The products formed with the oxygen-donating curing agents are substantially tackier than conventional gloves formed with conventional curing and cross-linking agents, which causes severe handling and storage problems (including products sticking together) if the products are not further treated, and the products are also not well suited to the chlorination treatments conventionally applied to conventional latex gloves for removing latex proteins therefrom. Further, subsequent processing steps including post-production leaching step S25 and drying step S27 become very difficult if the coating is not applied. The second coating according to the invention overcomes all of such problems and limitations of products formed with the natural rubber latex compositions including oxygen-donating curing agents, and the coating otherwise generally improves the slip of any finished products to which it is applied, facilitating donning of the same.

If the first (wax) blocking coating according to the invention is coated onto products formed from the oxygen cured natural rubber latex compositions according to the invention, rather than the second (polymeric) coating, the coated products may have insufficient slip characteristics.

Either of the coating agents according to the invention may be applied to conventional sulfur-cured latex gloves and other products, and the coatings are effective for blocking transfer of latex proteins from any type of natural rubber latex glove, and for improving the slip of the products.

At step S23 the coated gloves or other products are again dried, for example at 70–90° C. for 2–5 minutes, while in step S24 the gloves are stripped from the formers, thus ending the continuous in-line portion of the manufacturing process. Drying step S23 may be omitted, and the gloves may be stripped in the formers in a wet state in step S24 to facilitate the optional post-production leaching step S25. The post-production leaching step S25 is desirable for improving the physical properties of the latex products and for further removing the latex proteins.

In the optional post-leaching step S25, a batch of the stripped gloves are transferred into a tank containing water with a solublizer such as ammonia or an alcohol, and the gloves are again leached for 15–60 minutes at ambient temperature. In step S26 an absorbable dusting powder is applied to the gloves, in step S27 the gloves are dried at, for example, 55–80° C. for 30–60 minutes, and the dried gloves represent the finished product in step S28. Optionally, the gloves may be tumbled, for example, at 70–90° C. for 15–40 minutes between steps S26 and S27 to assure uniform application of the absorbable dusting powder over the gloves' surfaces. Further, the powdering step S27 may be omitted if "powder free" gloves are desired, which will often be the situation because the gloves have otherwise been coated with the first (wax) or second (silicone-based) coatings according to the invention, and thus have favorable and sufficient slip characteristics even without the dusting powder.

Referring to Table I below, characteristics of a latex glove or other product produced according to the invention, including butyl-peroxide, oxygen-donating curing agent, MMA as the organic strength enhancing agent, TEPA as the activator, tert-butyl hydroperoxide as the cross-linking-polymerizing agent, and the second (polymeric) blocking coating, are disclosed together with the corresponding characteristics of a comparative rubber latex glove produced using conventional sulfur, dithiocarbamate and zinc compounds in its curing process and without a blocking coating applied thereto. The latex gloves according to the invention are, as expected, free of sulfur, carbamate and zinc compounds, and have been used with complete success in relation to the vinyl polysiloxane DIM, i.e., the DIM completely cures and hardens even after being contacted with the latex gloves when forming an impression of a patient's teeth.

Further, the gloves formed according to the invention are substantially free of the potentially carcinogenic nitrosamine, and thus are very well suited for all applications, even those involving contact with the mouth and other body cavities. The conventional latex glove contains nitrosamine in an amount greater than 2 ppm.

Still further, the latex glove according to the invention has a latex protein level of 0.3–0.5, mg/g determined according to the Modified Lowry's Test, whereas the normal level is 2.0–5.0 mg/g. A latex protein level of 0.1 or less is considered absolutely hypoallergenic.

Although the sample rubber latex gloves according to the invention somewhat inferior in tensile strength and modulus of elasticity than the conventional rubber latex gloves formed using sulfur and related curing agents, the gloves according to the invention are adequately meet necessary standards for these properties, and may be reliably used for substantially any conventional purpose. Moroever, when the rubber latex compositions according to the invention are alternatively or additionally formulated with an inorganic strength enhancing agent such as fumed silica, the strength characteristics thereof are improved as discussed above. Additionally, the gloves according to the invention are somewhat more stretchable or elastic than the conventional rubber latex gloves.

TABLE I

| Physical Characteristics | Invention Sample | Comparative Sample | ASTM Limits |
| --- | --- | --- | --- |
| Tensile Strength, MPa | 21–24 | 22–27 | 21 |
| Modules, 300%, MPa | 0.9–1.0 | 1.0–1.1 | Not controlled |
| Elongation, % | 900–1000 | 700–900 | |
| Protein Level, mg/g | 0.3–0.5 | 2.0–5.0 | |
| Nitrosamine | Free | >2 ppm | Not controlled |
| Taste | Not bitter | Not bitter | |
| Smell | of Corn Starch USP | of Corn Starch USP | USP grade |
| Sulfur | Free | Yes | |
| Zinc | Free | Yes | |
| Carbamate | Free | Yes | |

Although there has been described what are present considered to be preferred embodiments of the invention, it will be understood that various modifications and variations may be made thereto without departing from the spirit and essence of the invention. The scope of the invention is indicated by the appended claims rather than by the foregoing description.

We claim:

1. A thin-walled natural rubber latex material which is substantially free of sulfur and also substantially free of nitrosamines, said material being produced from an emulsion comprising natural rubber, an oxygen-donating curing agent, and an inorganic strength-enhancing agent in an amount ranging from about 1 to about 3 parts by weight of 100 parts by weight of natural rubber:

said natural rubber latex material further comprising a polymeric coating provided on a surface thereof for improving slip and for blocking transfer of latex proteins from the material, said coating comprising silicone, fine silicon dioxide particles and a binding agent.

2. A thin-walled natural rubber latex material which is substantially free of sulfur and also substantially free of nitrosamines, said material being produced from an emulsion of natural rubber, an oxygen-donating curing agent, and an inorganic strength enhancing agent, wherein:

said emulsion contains the inorganic strength enhancing agent in an amount within the range of from about 1–3 parts by weight per 100 parts by weight of natural rubber;

said inorganic strength enhancing agent is fumed silica, and is added to said emulsion in an aqueous dispersion; and said thin-walled natural rubber latex material further comprises a water resistant, heat resistant coating provided on a surface thereof for improving slip of the material, said coating comprising silicone, fine silicon dioxide particles and a binding agent, and having a thickness in a range of 0.5–4.0 micrometers.

* * * * *